June 24, 1930.  C. J. MUEND  1,765,693

SWING JOINT COUPLING

Filed Jan. 30, 1928

Inventor
Charles J. Muend,
By  [signature]
Attorney

Patented June 24, 1930

1,765,693

UNITED STATES PATENT OFFICE

CHARLES J. MUEND, OF PHILADELPHIA, PENNSYLVANIA

SWING-JOINT COUPLING

Application filed January 30, 1928. Serial No. 250,405.

My invention relates to improvements in swing joint for showers. The object is to provide an improved swing joint coupling for showers that will move in a vertical plane that will be proof against leaks, and that will not work loose by repeated operations.

The invention comprises two channeled or pipe elements having means for connection between the service pipe and the shower head. These elements have intercommunicating passages and an annular gland cooperating with oppositely disposed packing. The gland is concentric with the axis of relative rotation between the elements. The elements are held together in proper relationship by a bolt and telescoping sleeve elements having cooperating recess and projection means for preventing relative rotative movement between said sleeve elements but to permit relative longitudinal movement. The sleeve elements are provided with gaskets between their heads and the coupling elements and a screw bolt is provided for holding the sleeve elements together having a gasket between the head of the screw bolt and a sleeve element.

Referring to the drawings which illustrate merely by way of example a suitable embodiment of my invention:—

Similar numerals refer to similar parts throughout the several views.

Figure 1:
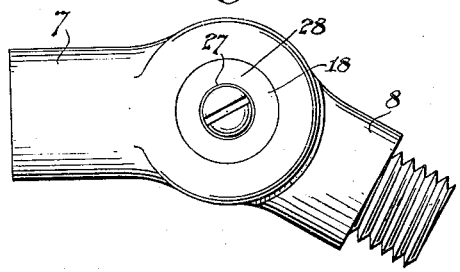
Fig. 1 is a plan view showing the coupling elements in slightly angular relationship.

The coupling elements 7 and 8 are provided with the channels or passages 9 and 10 which are in communication through the ports 11 and 12, which form intercommunicating passages. The coupling elements are provided, one with an interiorly threaded end, and the other with an exteriorly threaded end for securing the device to the line and to the shower head in accordance with the common practice. The inner adjacent faces of the elements 7 and 8 are provided with registering annular channels 13 and 14 of substantially rectangular cross-section, for receiving the gland or annular metal ring 15 of substantially square cross-section. This ring 15 serves the double purpose of a gland and of a friction ring. A suitable packing ring 16 is provided in each annular channel between the bottom of the channel and the ring 15 projecting therein. The outer faces of elements 7 and 8 are provided with recesses 17 for receiving the flanged heads 18 and 19 of the sleeve elements 20 and 21. Sleeve element 21 is adapted to telescope within the sleeve element 20. Element 21 is provided with a series of longitudinal channels 22 for cooperating with a series of longitudinal ribs 23 in the bore of element 20, to prevent relative rotative movement between the two sleeve elements but to permit relative longitudinal movement between the two. Element 21 is also provided with an interiorly threaded opening for receiving the end of the threaded element or screw bolt 24. A gasket 25 is provided between the flange 18 and the bottom of the recess 17 of element 7 and a similar gasket 26 is provided between the flange 19 and the bottom of the recess 17 in element 8. The head of element 20 is also recessed to receive a relatively soft resilient gasket 27 for sealing the head 28 of the screw bolt with said element 20.

In operation:—

Figure 2:
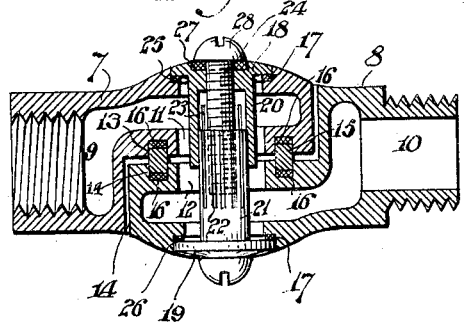
Fig. 2 is a longitudinal section through the device when the coupling elements are in alinement.
Figure 4:
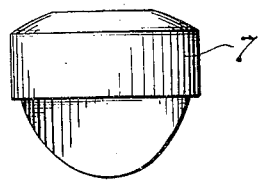
Fig. 4 is an inner end elevation of one of the coupling elements.
Figure 3:
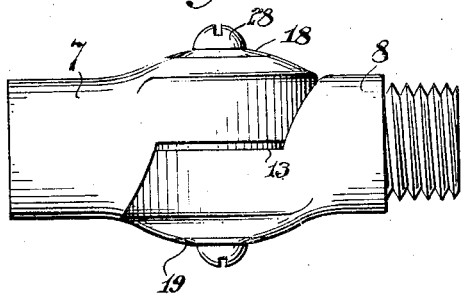
Fig. 3 is a side elevation of same.
Figure 5:
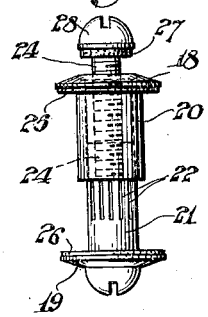
Fig. 5 is an elevation of the sleeve elements and securing screw bolt.

When the parts are assembled as shown in Figs. 2 and 3, by tightening the screw bolt 24 into the sleeve element 21, the element 20 is forced down over element 21 thus pressing the adjacent faces of elements 7 and 8 toward each other, thereby creating pressure between the ring 15 and the packings 16 on each side thereof, also creating pressure between the flanged heads 18 and 19 and the gaskets 25 and 26 and also creating pressure on the gasket 27 thus forming a perfectly water-tight joint between the two elements 7 and 8.

It will also be noted that the gasket 27 is of substantial body and of resilient material, which serves as a resilient cushion in maintaining a resilient or yielding pressure between the coupling elements and the annular gland.

When the two elements 7 and 8 are adjusted from time to time on their common axis of movement the chief frictional action is between the ring 15 and the packing on either side thereof. As the sleeve elements 20 and 21 are splined together against relative rotative movement, it will be noted that no adjusting movements between the coupling elements 7 and 8 can have any effect upon the position of the screw bolt with respect to the sleeve elements so that there is no posibility of working the bolt loose by manipulating the coupling elements. By this device it will also be noted that the swing joint coupling elements move only on a single axis so that when the device is properly adjustable the shower head can only swing up and down and not sideways. This is an advantage as it prevents swinging the shower head sideways out of alinement with the tub.

What I claim is:

A swing joint coupling, comprising two elements having communicating channels, a gland and annular bodies of packing on each side thereof interposed between said channelled elements, a pair of telescoping sleeves for connecting said coupling elements, each sleeve having a flanged head, means preventing relative rotative movement of the sleeves, a headed screw extending loosely through one sleeve and threaded into the other sleeve, and a substantial body of resilient material interposed between the screw head and a sleeve head whereby adjustable resilient pressure is exerted between the gland and the flanking bodies of packing.

CHARLES J. MUEND.